United States Patent
Wu et al.

(10) Patent No.: US 10,254,794 B1
(45) Date of Patent: Apr. 9, 2019

(54) LIFTING TYPE ELECTRONIC DEVICE

(71) Applicant: Compal Electronics, Inc., Taipei (TW)

(72) Inventors: Tung-Ying Wu, Taipei (TW);
Ming-Chung Liu, Taipei (TW);
Hsin-Chieh Fang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 16/036,746

(22) Filed: Jul. 16, 2018

(30) Foreign Application Priority Data

May 22, 2018 (TW) .............................. 107117362 A (51) Int. Cl.
*G06F 1/16* (2006.01)
(52) U.S. Cl.
CPC .......... *G06F 1/1641* (2013.01); *G06F 1/1601* (2013.01); *G06F 1/166* (2013.01)
(58) Field of Classification Search
CPC ....... G06F 1/1616; G06F 1/1624; G06F 1/165
USPC ........................................ 361/679.05, 679.27
See application file for complete search history.

(56) References Cited

U.S. PATENT DOCUMENTS

| | | | | |
|---|---|---|---|---|
| 2008/0137273 A1* | 6/2008 | Li | ................. | G06F 1/1601 361/679.05 |
| 2013/0220043 A1* | 8/2013 | Hsu | ................. | F16H 21/44 74/101 |
| 2014/0139980 A1* | 5/2014 | Horii | ................. | G06F 1/1616 361/679.01 |
| 2014/0193193 A1* | 7/2014 | Wikander | ............. | G06F 1/1616 403/322.1 |

FOREIGN PATENT DOCUMENTS

| | | |
|---|---|---|
| CN | 107122006 A | 9/2017 |
| TW | M251168 U | 11/2004 |

* cited by examiner

*Primary Examiner* — Anthony Q Edwards (57) ABSTRACT

A lifting type electronic device includes a first body, a second body and a lifting mechanism. The second body includes a fixing plate and a moving plate. The lifting mechanism is connected between the fixing plate and the moving plate and is adapted to move the moving plate between the initial position and the lifted-up position. The lifting mechanism includes a first moving member, a pressing member, at least one second moving member, and at least one elastic member.

13 Claims, 6 Drawing Sheets

LIFTING TYPE ELECTRONIC DEVICE

FIELD OF THE INVENTION

The present invention relates to an electronic device, and more particularly to a lifting type electronic device.

BACKGROUND OF THE INVENTION

The display screen and the host computer of a notebook computer are often connected in pivoting manner, so that the position or the angle of the display screen may be adjusted to be fixed, which causes the user's viewing angle to be limited. If wanting to adjust the display screen to make the viewing experience more comfortable, the users may need to adjust the position or angle of the display screen by other supporting items.

The prior art uses a lifting adjustment device so that the users can easily adjust the height of the display screen. However, adding a lifting adjustment device may make the thickness of the screen thicker and cause the overall size of the notebook computer to increase.

SUMMARY OF THE INVENTION

The present invention provides a lifting type electronic device to improve the problem of the excessive thickness of the conventional lifting type display screen.

A lifting type electronic device provided by the present invention includes a first body, a second body and a lifting mechanism. The second body includes a fixing plate and a moving plate. The fixing plate is pivotally connected to the first body. The moving plate covers the fixing plate. The lifting mechanism is connected between the fixing plate and the moving plate and adapted to move the moving plate along a first axial direction between an initial position and a lifted-up position. The lifting mechanism includes a first moving member, a pressing member, at least one second moving member, and at least one first elastic member. The first moving member is disposed along the first axial direction. Two ends of the first moving member respectively have a first abutting portion and a second abutting portion. The first abutting portion is adjacent where the fixing plate and the first moving member are pivotally connected. The pressing member abuts against the first abutting portion. The at least one second moving member is disposed along a second axial direction intersecting with the first axial direction. Two ends of each of the second moving members respectively have a third abutting portion and an engaging portion. The third abutting portion abuts against the second abutting portion. The engaging portion is adapted to be engaged with the fixing plate. The at least one first elastic member is disposed along the first axial direction and connected to the moving plate and the fixing plate.

In an embodiment of the present invention, when the moving plate is located at the initial position, the at least one first elastic member is in a compressed state, and the engaging portion is engaged with the fixing plate. When the pressing member is pressed by an external force, the first moving member is pushed to move in the first axial direction toward the pressing member. When the first moving member moves, the at least one second moving member is pushed to move in the second axial direction toward the first moving member to release an engaged state between the engaging portion and the fixing plate, so that the first elastic member is released and the moving plate is pushed to move to the lifted-up position.

In an embodiment of the present invention, the first abutting portion has a first abutting slope. The second abutting portion has at least one second abutting slope. The third abutting portion has a third abutting slope. The press member has a fourth abutting slope. The first abutting slope abuts against the fourth abutting slope. The at least one second abutting slope abuts the third abutting slope of the at least one second moving member.

In an embodiment of the present invention, the fixing plate has at least one protruding portion. Each of the protruding portions is disposed with a clip slot. The engaging portion is adapted to be engaged with the clip slot. The at least one first elastic member is connected between the at least one protruding portion and the moving plate. The moving plate has at least one slider opened along the first axial direction. The at least one protruding portion is in the at least one slider.

In an embodiment of the present invention, the aforementioned lifting type electronic device further includes at least one second elastic member connected between the at least one second moving member and the moving plate. When the first moving member pushes the at least one second moving member to move in the second axial direction toward the first moving member, the at least one second elastic member is compressed.

In an embodiment of the present invention, each of the second moving members has a rod portion disposed along the second axial direction and at least one extending portion extending from the rod portion. Two ends of the rod portion have the third abutting portion and the engaging portion. Each of the second elastic members abuts between each of the extending portions and the moving plate.

In an embodiment of the present invention, the moving plate has a first accommodating groove, at least one second accommodating groove, and at least one third accommodating groove. The first accommodating groove accommodates the first moving member. The at least one second accommodating groove accommodates the at least one second moving member and the at least one second elastic member. The at least one third accommodating groove accommodates the at least one first elastic member.

In an embodiment of the present invention, the second body further includes at least one deceleration device. Each of the deceleration devices includes a rack and at least one gear. The rack is disposed on the moving plate along the first axial direction. The at least one gear is disposed on the fixing plate and meshes with the rack.

In an embodiment of the present invention, the moving plate has at least one accommodating groove for accommodating the at least one deceleration device.

In an embodiment of the present invention, the first axial direction is perpendicular to the second axial direction.

In an embodiment of the present invention, the second body further includes a display panel disposed on the moving plate.

In an embodiment of the present invention, an element setting area of the fixing plate is exposed when the moving plate is located at the lifted-up position.

In an embodiment of the present invention, the second body further includes at least one of a display panel and a speaker disposed in the element setting area.

In summary, the lifting type electronic device of the present embodiment has a lifting mechanism. When the pressing member in the lifting mechanism is pressed by an external force, the first moving member is pushed to move in the first axial direction toward the pressing member. When the moving member moves, the second moving member is pushed to move in the second axial direction toward the first moving member to release the engaged state between the engaging portion and the clip slot, so that the first elastic member is released to push the moving plate to move from the initial position to the lifted-up position. When the moving plate is located at the lifted-up position, the element setting region of the fixing plate is exposed. Since each element of the lifting mechanism and the relative movement direction are designed to have a flat design, the thickness of the second body can be reduced, and the overall thickness of the lifting type electronic device can be reduced.

BRIEF DESCRIPTION OF THE DRAWING

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
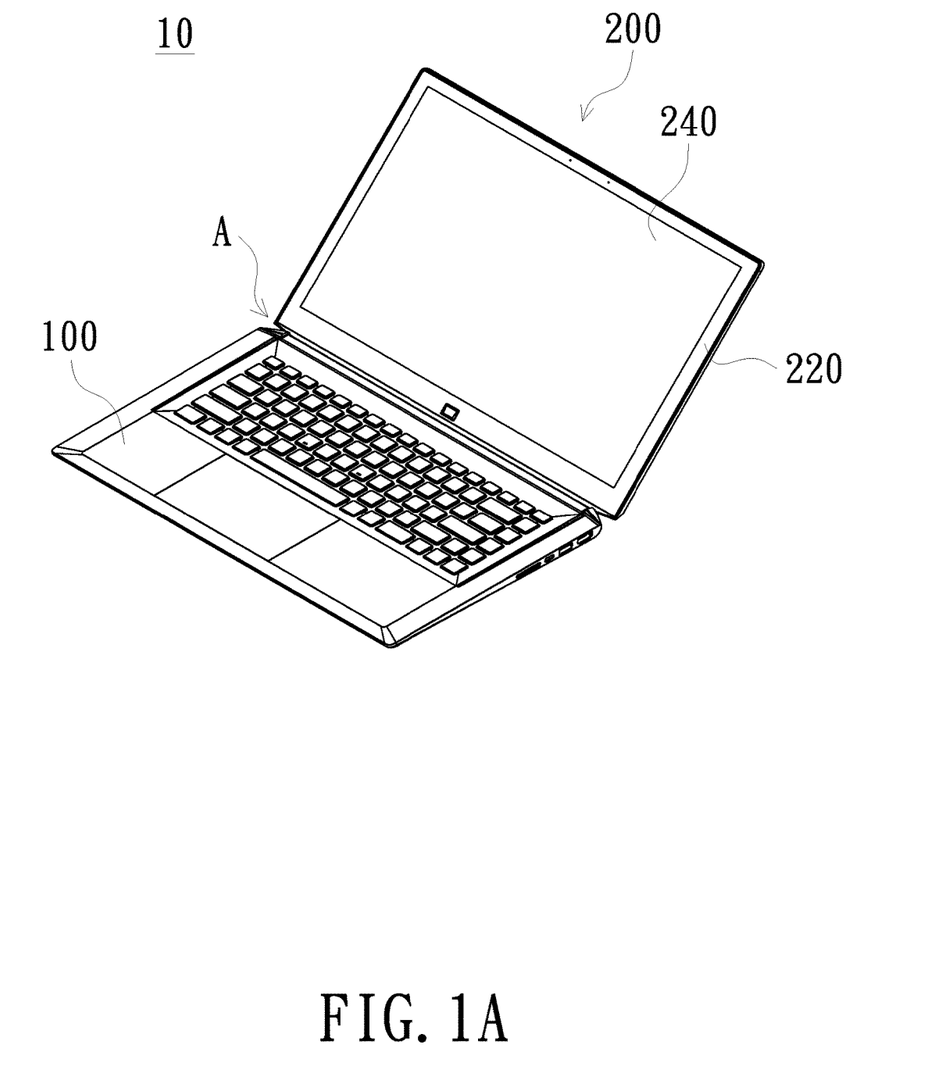
FIG. 1A is a schematic view of a lifting type electronic device according to an embodiment of the present invention.
Figure 1B:
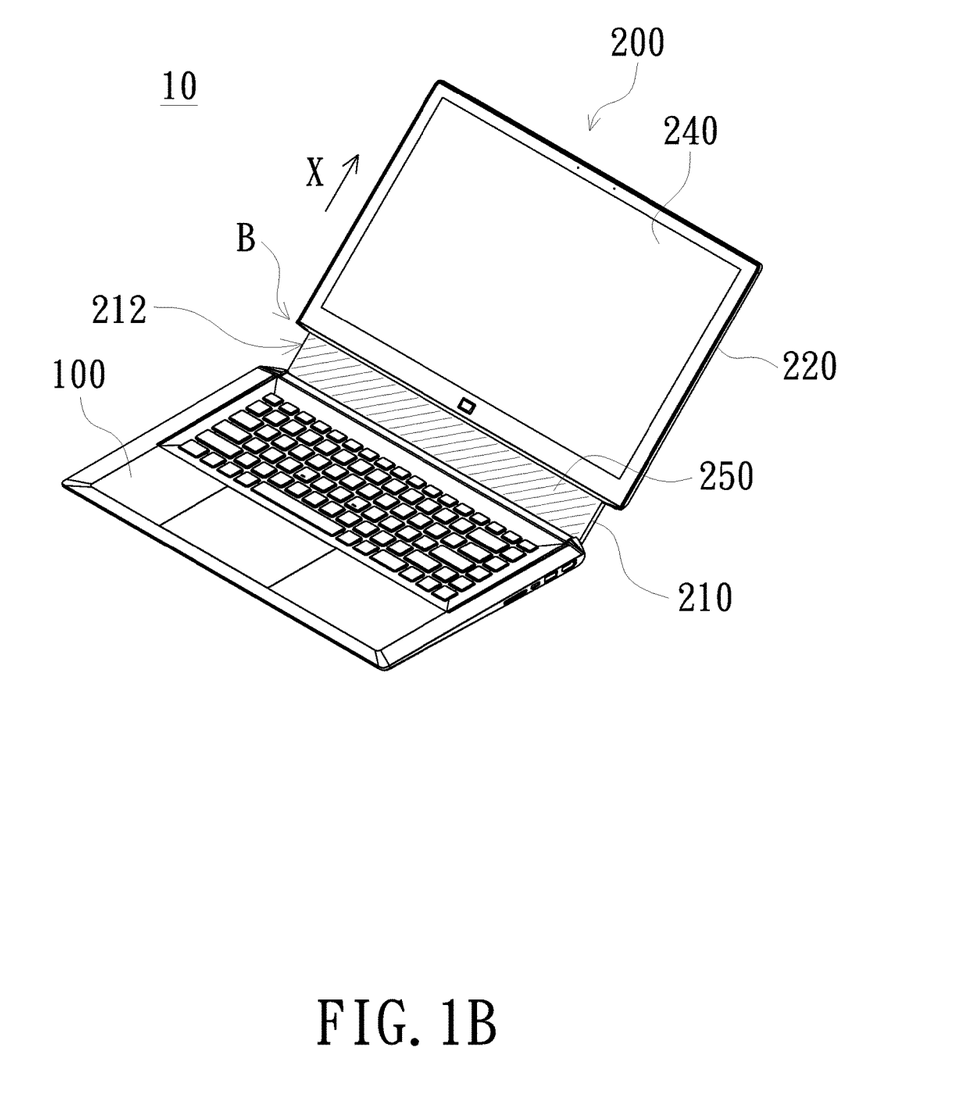
FIG. 1B is a schematic view of the lifting type electronic device of FIG. 1 when its display panel is lifted up.
Figure 2:
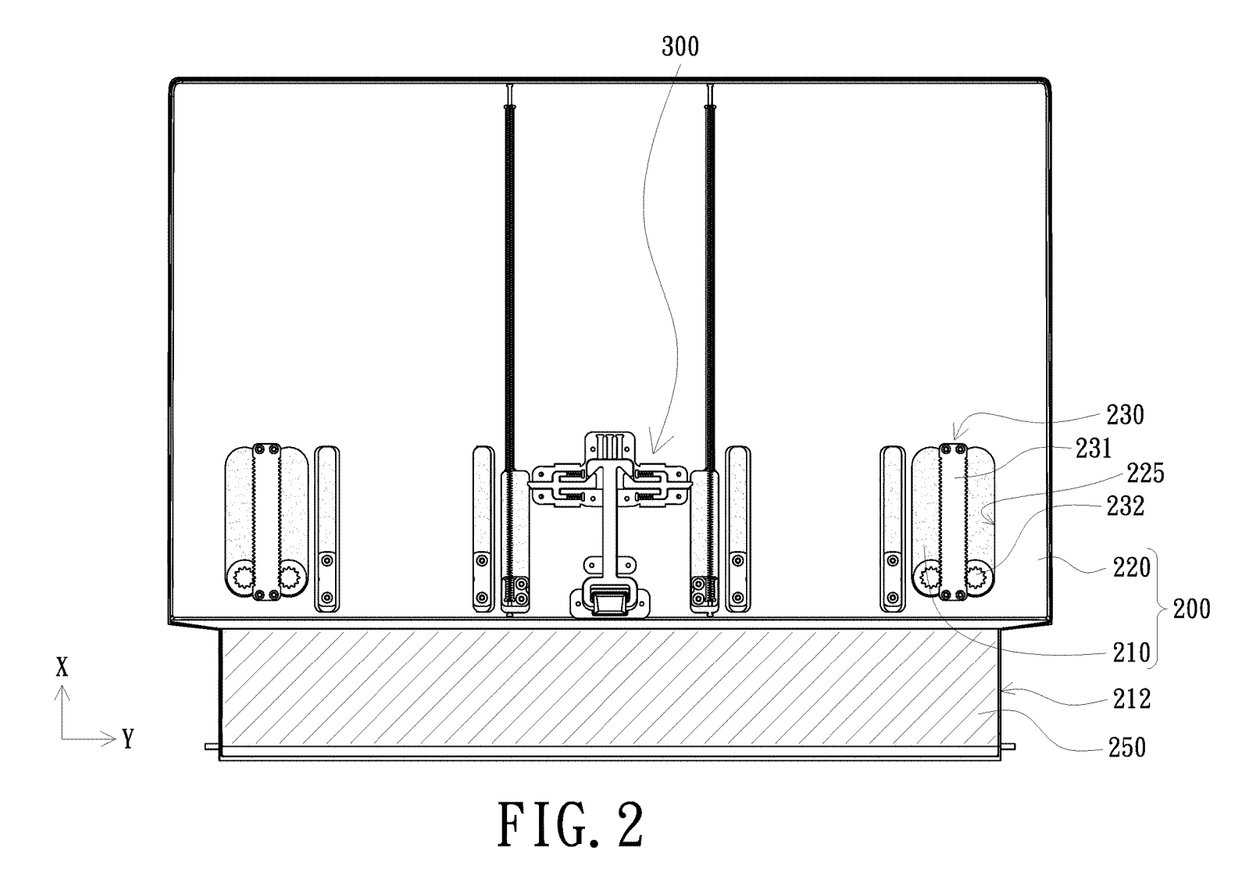
FIG. 2 is a schematic view of a moving plate of a second body in a lifted-up position according to an embodiment of the present invention.

FIG. 1A is a schematic view of a lifting type electronic device according to an embodiment of the present invention. FIG. 1B is a schematic view of the lifting type electronic device of FIG. 1 when its display panel is lifted up. FIG. 2 is a schematic view of a moving plate of a second body in a lifted-up position according to an embodiment of the present invention. Referring to FIGS. 1A, 1B and 2, the lifting type electronic device 10 of the present embodiment includes a first body 100, a second body 200 and a lifting mechanism 300. The lifting type electronic device 10 of the present embodiment is, for example, a notebook computer, but the present invention is not limited thereto. The first body 100 is, for example, a host computer and is disposed with a keyboard and a touchpad, but not limited thereto. The second body 200 includes a fixing plate 210 and a moving plate 220. The fixing plate 210 is pivotally connected to the first body 100. The moving plate 220 covers the fixing plate 210. The lifting mechanism 300 is connected between the fixing plate 210 and the moving plate 220, and is adapted to move the moving plate 220 in the first axial direction X between the initial position A and the lifted-up position B. The element setting area 212 of the fixing plate 210 is exposed when the moving plate 220 is in the lifted-up position B.

The second body 200 further includes, for example, a display panel 240 disposed on the moving plate 220, and the display panel 240 can move along with the moving plate 220. The display panel 240 may be a liquid crystal display panel or an organic light emitting display panel, but not limited thereto. The second body 200 further includes, for example, at least one of a display panel 250 and a speaker (not shown), which are disposed in the element setting area 212. The element setting area 212 may be provided with other elements (e.g., illumination device), and the present invention does not limit the element types provided in the element setting area 212. In the present embodiment, since being disposed on the moving plate 220, the display panel 240 can be lifted by the lifting mechanism 300. The element setting area 212 of the fixing plate 210 is exposed when the moving plate 220 is located at the lifted-up position B, and at this time, the element disposed in the element setting area 212 can be turned on. Hereinafter, the detailed structure and implementation of the lifting mechanism 300 of the lifting type electronic device 10 will be further described.

Figure 3:
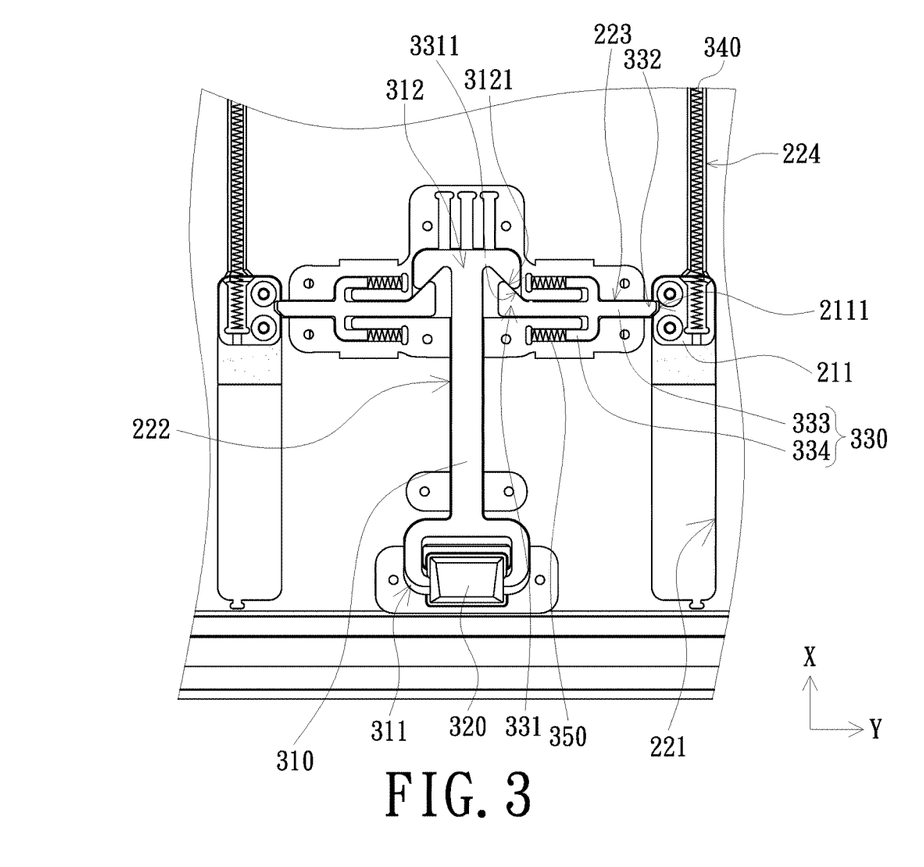
FIG. 3 is a schematic view of a lifting mechanism when a moving plate of a second body is located at an initial position according to an embodiment of the present invention.
Figure 4:
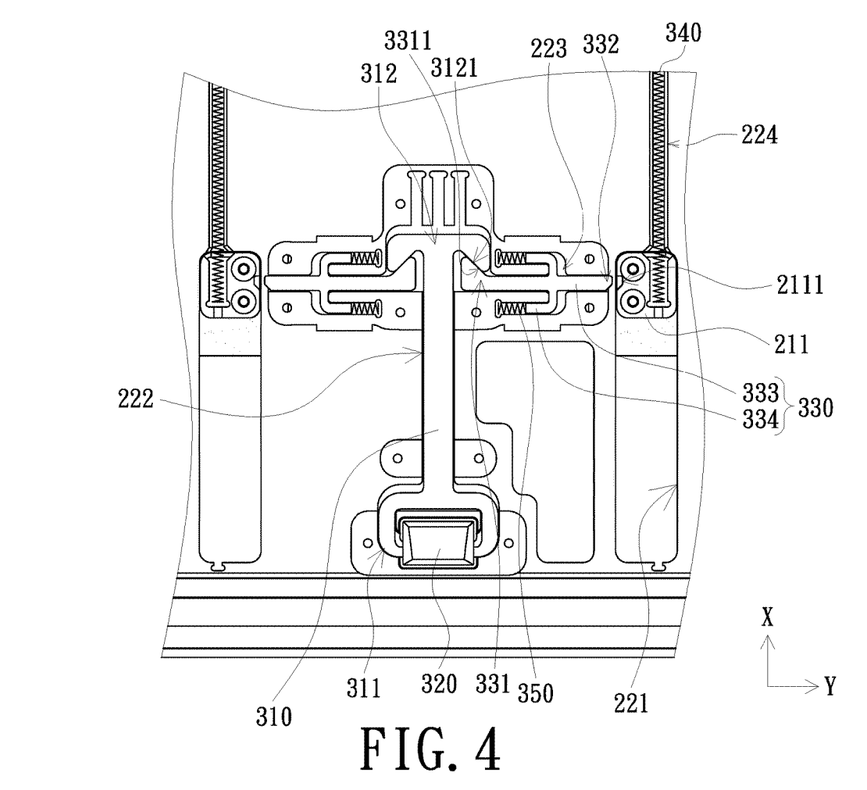
FIG. 4 is a schematic view of a lifting mechanism of FIG. 3 when an engaged state between an engaging portion and a fixing plate is released.

FIG. 3 is a schematic view of a lifting mechanism when a moving plate of a second body is located at an initial position according to an embodiment of the present invention. Referring to FIG. 3, the lifting mechanism 300 of the present embodiment includes a first moving member 310, a pressing member 320, at least one second moving member 330, and at least one first elastic member 340. In the present embodiment, two second moving members 330 and two first elastic members 340 are taken as an example. The first moving member 310 is disposed in the first axial direction X. The two ends of the first moving member 310 respectively have a first abutting portion 311 and a second abutting portion 312. The first abutting portion 311 is adjacent where the fixing plate 210 and the first body 100 are pivotally connected. The pressing member 320 abuts against the first abutting portion 311. The second moving member 330 is disposed in the second axial direction Y intersecting the first axial direction X. The first axial direction X is, for example, perpendicular to the second axial direction Y, but not limited thereto. The two ends of each second moving member 330 respectively have a third abutting portion 331 and an engaging portion 332. The third abutting portion 331 abuts against the second abutting portion 312. The engaging portion 332 is adapted to be engaged with the fixing plate 210. The first elastic member 340 is disposed in the first axial direction X and is connected to the moving plate 220 and the fixing plate 210. When the moving plate 220 is located at the initial position A, the first elastic member 340 is in a compressed state and the engaging portion 332 is engaged with the fixing plate 210. As shown in FIG. 4, when the pressing member 320 is pressed by an external force, the first moving member 310 is pushed to move in the first axial direction X toward the pressing member 320. When the first moving member 310 moves, the second moving member 330 is pushed to move in the second axial direction Y toward the first moving member 310 (i.e., the right second moving member 330 in FIG. 4 moves to the left, and the left second moving member 330 moves to the right) so as to release the engaged state between the engaging portion 332 and the fixing plate 210, and therefore the first elastic member 340 is released to push the moving plate 220 to move to the lifted-up position B.

Figure 5:
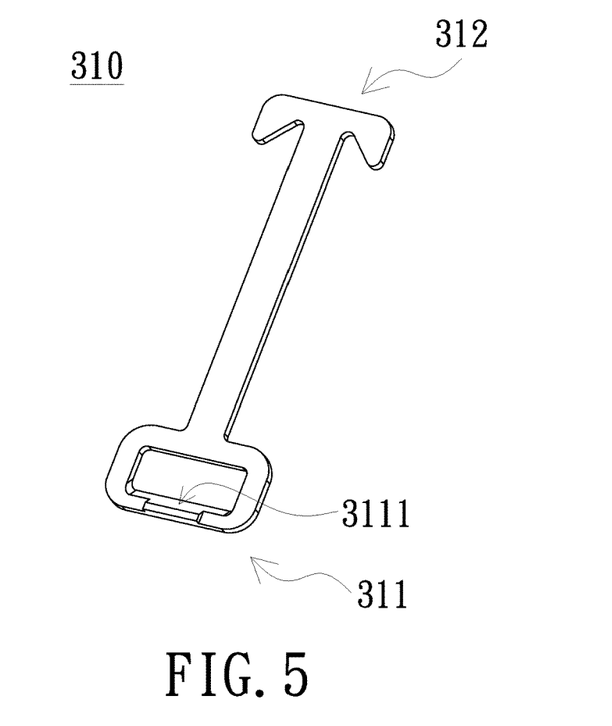
FIG. 5 is a schematic perspective view of a first moving member according to an embodiment of the present invention.
Figure 6:
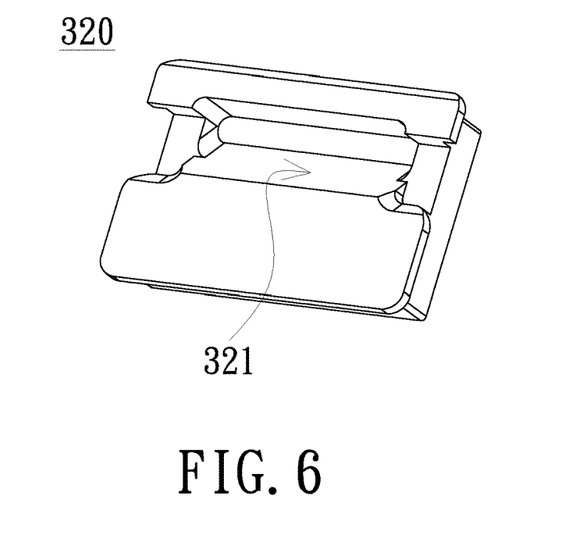
FIG. 6 is a schematic perspective view of a pressing member according to an embodiment of the present invention

FIG. 5 is a schematic perspective view of a first moving member according to an embodiment of the present invention, and FIG. 6 is a schematic perspective view of a pressing member according to an embodiment of the present invention. Referring to FIGS. 4 to 6, the first abutting portion 311 of the first moving member 310 has, for example, a first abutting slope 3111. The second abutting portion 312 has at least one second abutting slope 3121. In the present embodiment, two second abutting slopes 3121 are taken as an example. The third abutting portion 331 of each second moving member 330 has, for example, a third abutting slope 3311. The pressing member 320 has, for example, a fourth abutting slope 321. The first abutting slope 3111 abuts against the fourth abutting slope 321, wherein the shapes of the first abutting slope 3111 and the fourth abutting slope 321 match to each other. When the pressing member 320 is pressed by an external force, the first moving member 310 is pushed to move by the fourth abutting slope 321 abutting against the first abutting slope 3111. When the first moving member 310 moves, the second moving member 330 is pushed to move by the second abutting slope 3121 abutting against the third abutting slope 3311 of the second moving member 330.

Referring again to FIGS. 3 and 4, the fixing plate 210 has, for example, at least one protruding portion 211. In the present embodiment, two protruding portions 211 are taken as an example. Each protruding portion 211 is provided with a clip slot 2111. The clip slot 2111 is, for example, disposed on the side of the protruding portion 211 and corresponds to the position of the engaging portion 332 so that the engaging portion 332 is adapted to be engaged with the clip slot 2111. The first elastic member 340 is connected between the protruding portion 211 and the moving plate 220, and the moving plate 220 has, for example, at least one slider 221 opened in the first axial direction X. In the present embodiment, two sliders 221 are taken as example. Each protruding portion 211 is located in a slider 221.

The lifting mechanism 300 may further include at least one second elastic member 350 connected between the at least one second moving member 330 and the moving plate 220. In the present embodiment, two second elastic members 350 connected to one second moving member 330 is taken as an example, but the invention is not limited thereto. Specifically, each second moving member 330 has, for example, a rod portion 333 disposed in the second axial direction Y and at least one extending portion 334 extending from the rod portion 333. In FIGS. 3 and 4, two extending portions 334 are taken as an example. The two ends of the rod portion 333 have the third abutting portion 331 and the engaging portion 332, and each second elastic member 350 abuts between each extending portion 334 and the moving plate 220. As such, when the first moving member 310 pushes the second moving member 330 to move in the second axial direction Y toward the first moving member 310, the second elastic member 350 is compressed so that the engaging portion 332 can be separated from the clip slot 2111 of the fixing plate 210. When the moving plate 220 is pushed back from the lifted-up position B to the initial position A, the second elastic member 350 pushes the second moving member 330 to move in the second axial direction Y away from the first moving member 310, so that the engaging portion 332 is engaged with the clip slot 2111 of the fixing plate 210 and thereby fixing the moving plate 220 at the initial position A.

The moving plate 220 in the present embodiment has, for example, a first accommodating groove 222, at least one second accommodating groove 223, and at least one third accommodating groove 224. In FIG. 3, two second accommodating grooves 223 and two third accommodating grooves 224 are taken as an example. The first accommodating groove 222 accommodates the first moving member 310. Each second accommodating groove 223 accommodates a second moving member 330 and a second elastic member 350. Each third accommodating groove 224 accommodates a first elastic member 340.

Referring to FIG. 2 again, the second body 200 may further include at least one deceleration device 230. In the present embodiment, two deceleration devices 230 are taken as an example. The moving plate 220 has, for example, at least one accommodating groove 225. In the present embodiment, two accommodating grooves 225 are taken as an example. Each accommodating groove 225 accommodates a deceleration device 230. Each deceleration device 230 includes a rack 231 and at least one gear 232. In the present embodiment, two gears 232 are taken as an example. The rack 231 is disposed on the moving plate 220 in the first axial direction X. The gear 232 is disposed on the fixing plate 210 and meshes with the rack 231.

When the first elastic member 340 is released and pushes the moving plate 220 to move from the initial position A to the lifted-up position B, the deceleration device 230 may provide resistance in the opposite direction through the meshing of the gear 232 with the rack 231 so as to prevent the moving plate 220 and the fixing plate 210 from generating an excessive impact force when the moving plate 220 moves to the lifted-up position B.

In summary, the lifting type electronic device 10 of the present embodiment has a lifting mechanism 300. When the pressing member 320 in the lifting mechanism 300 is pressed by an external force, the first moving member 310 is pushed to move in the first axial direction X toward the pressing member 320. When the moving member 310 moves, the second moving member 330 is pushed to move in the second axial direction Y toward the first moving member 310 to release the engaged state between the engaging portion 332 and the clip slot 2111, so that the first elastic member 340 is released to push the moving plate 220 to move from the initial position A to the lifted-up position B. When the moving plate 220 is located at the lifted-up position B, the element setting region 212 of the fixing plate 210 is exposed. Since each element of the lifting mechanism 300 and the relative movement direction are designed to have a flat design, the thickness of the second body 200 can be reduced, and the overall thickness of the lifting type electronic device 10 can be reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lifting type electronic device, comprising:
a first body;
a second body, comprising a fixing plate and a moving plate, wherein the fixing plate is pivotally connected to the first body, and the moving plate covers the fixing plate; and a lifting mechanism, connected between the fixing plate and the moving plate and adapted to move the moving plate along a first axial direction between an initial position and a lifted-up position, wherein the lifting mechanism comprises:
- a first moving member, disposed along the first axial direction, wherein two ends of the first moving member respectively have a first abutting portion and a second abutting portion, and the first abutting portion is adjacent where the fixing plate and the first moving member are pivotally connected;
- a pressing member, abutting against the first abutting portion;
- at least one second moving member, disposed along a second axial direction intersecting with the first axial direction, wherein two ends of each of the second moving members respectively have a third abutting portion and an engaging portion, the third abutting portion abuts against the second abutting portion, and the engaging portion is adapted to be engaged with the fixing plate; and
- at least one first elastic member, disposed along the first axial direction and connected to the moving plate and the fixing plate.

2. The lifting type electronic device according to claim 1, wherein when the moving plate is located at the initial position, the at least one first elastic member is in a compressed state, and the engaging portion is engaged with the fixing plate, wherein when the pressing member is pressed by an external force, the first moving member is pushed to move in the first axial direction toward the pressing member, wherein when the first moving member moves, the at least one second moving member is pushed to move in the second axial direction toward the first moving member to release an engaged state between the engaging portion and the fixing plate, so that the first elastic member is released and the moving plate is pushed to move to the lifted-up position.

3. The lifting type electronic device according to claim 1, wherein the first abutting portion has a first abutting slope, the second abutting portion has at least one second abutting slope, the third abutting portion has a third abutting slope, the press member has a fourth abutting slope, the first abutting slope abuts against the fourth abutting slope, and the at least one second abutting slope abuts the third abutting slope of the at least one second moving member.

4. The lifting type electronic device according to claim 1, wherein the fixing plate has at least one protruding portion, each of the protruding portions is disposed with a clip slot, the engaging portion is adapted to be engaged with the clip slot, the at least one first elastic member is connected between the at least one protruding portion and the moving plate, the moving plate has at least one slider opened along the first axial direction, and the at least one protruding portion is in the at least one slider.

5. The lifting type electronic device according to claim 1, further comprising at least one second elastic member connected between the at least one second moving member and the moving plate, wherein when the first moving member pushes the at least one second moving member to move in the second axial direction toward the first moving member, the at least one second elastic member is compressed.

6. The lifting type electronic device according to claim 5, wherein each of the second moving members has a rod portion disposed along the second axial direction and at least one extending portion extending from the rod portion, two ends of the rod portion have the third abutting portion and the engaging portion, and each of the second elastic members abuts between each of the extending portions and the moving plate.

7. The lifting type electronic device according to claim 5, wherein the moving plate has a first accommodating groove, at least one second accommodating groove, and at least one third accommodating groove, the first accommodating groove accommodates the first moving member, the at least one second accommodating groove accommodates the at least one second moving member and the at least one second elastic member, and the at least one third accommodating groove accommodates the at least one first elastic member.

8. The lifting type electronic device according to claim 1, wherein the second body further comprises at least one deceleration device, and each of the deceleration devices comprises:
- a rack, disposed on the moving plate along the first axial direction; and
- at least one gear, disposed on the fixing plate and meshing with the rack.

9. The lifting type electronic device according to claim 8, wherein the moving plate has at least one accommodating groove for accommodating the at least one deceleration device.

10. The lifting type electronic device according to claim 1, wherein the first axial direction is perpendicular to the second axial direction.

11. The lifting type electronic device according to claim 1, wherein the second body further comprises a display panel disposed on the moving plate.

12. The lifting type electronic device according to claim 1, wherein an element setting area of the fixing plate is exposed when the moving plate is located at the lifted-up position.

13. The lifting type electronic device according to claim 12, wherein the second body further comprises at least one of a display panel and a speaker disposed in the element setting area.

* * * * *